(12) United States Patent
Chen et al.

(10) Patent No.: US 11,517,123 B2
(45) Date of Patent: Dec. 6, 2022

(54) SPRING SWINGING ELECTROMAGNETIC CRADLE

(71) Applicants: Way-Hong Chen, Taipei (TW); Sih-Han Chen, Taipei (TW)

(72) Inventors: Way-Hong Chen, Taipei (TW); Sih-Han Chen, Taipei (TW)

( * ) Notice: Subject to any disclaimer, the term of this patent is extended or adjusted under 35 U.S.C. 154(b) by 377 days.

(21) Appl. No.: 16/886,855

(22) Filed: May 29, 2020

(65) Prior Publication Data

US 2021/0369001 A1 Dec. 2, 2021

(51) Int. Cl.
*A47D 9/02* (2006.01)
*H02K 33/02* (2006.01)

(52) U.S. Cl.
CPC .............. *A47D 9/02* (2013.01); *H02K 33/02* (2013.01)

(58) Field of Classification Search
CPC ................................. A47D 9/02; H02K 33/02
USPC ............................................................ 5/108
See application file for complete search history.

(56) References Cited

U.S. PATENT DOCUMENTS

| | | | | |
|---|---|---|---|---|
| 2,768,580 A * | 10/1956 | Parker | ..................... | H02K 33/02 417/274 |
| 2,869,145 A * | 1/1959 | Gregory | .................... | A47D 9/02 280/31 |
| 2,869,538 A * | 1/1959 | Hawk | ..................... | A47D 9/02 600/26 |
| 2,979,735 A * | 4/1961 | Helmer | ................. | B60N 2/2854 D6/385 |
| 3,031,687 A * | 5/1962 | McNeil Stevens | ....... | B62B 9/22 5/109 |
| 3,119,125 A * | 1/1964 | Hayes | ...................... | A47D 9/02 5/109 |
| 3,261,032 A * | 7/1966 | Reardon | ................... | A47D 9/02 5/108 |
| 3,724,006 A * | 4/1973 | Malabanan | .............. | A47D 9/02 5/109 |
| 4,258,446 A * | 3/1981 | McAllister | ............... | A47D 9/02 5/105 |
| 4,590,631 A * | 5/1986 | Varney | ..................... | A47D 9/02 5/103 |
| 4,934,997 A * | 6/1990 | Skakas | ..................... | A47D 7/04 5/120 |
| 5,013,086 A * | 5/1991 | Benzur | .................... | A47D 9/02 297/133 |
| 5,123,701 A * | 6/1992 | Bottamiller | .......... | A47C 3/0257 5/108 |

(Continued)

*Primary Examiner* — David R Hare
*Assistant Examiner* — Luke Hall
(74) *Attorney, Agent, or Firm* — Alan D. Kamrath; Karin L. Williams; Mayer & Williams PC

(57) ABSTRACT

An electromagnetic cradle includes a support frame, a swinging table, multiple abutting members, a magnetic box, and an electromagnetic device. The support frame includes two support rods each provided with multiple rollers. The abutting members are secured to the bottom of the swinging table and rest on the rollers respectively. The magnetic box is secured to the bottom of the table board. The electromagnetic device is secured to the support frame. The electromagnetic device is located under and corresponds to the magnetic box. The electromagnetic device produces a magnetic force to attract or repel the magnetic box that is mounted on the swinging table, so as to pull or push the swinging table, such that the swinging table horizontally swings successively and reciprocatingly.

3 Claims, 7 Drawing Sheets

(56) References Cited

U.S. PATENT DOCUMENTS

| | | | | |
|---|---|---|---|---|
| 5,303,433 | A * | 4/1994 | Jang | A47D 9/04 |
| | | | | 5/109 |
| 5,487,705 | A * | 1/1996 | Clarke | A63G 1/30 |
| | | | | 472/36 |
| 9,888,787 | B1 * | 2/2018 | Chen | H02K 33/10 |
| 2002/0113469 | A1 * | 8/2002 | Stern | A47D 13/10 |
| | | | | 297/256.16 |
| 2005/0005353 | A1 * | 1/2005 | Waldman | A47D 13/02 |
| | | | | 5/101 |
| 2005/0244290 | A1 * | 11/2005 | Inagaki | H02K 7/14 |
| | | | | 417/415 |
| 2006/0012230 | A1 * | 1/2006 | Kennedy | A47D 9/02 |
| | | | | 297/260.1 |
| 2007/0120404 | A1 * | 5/2007 | Bellows | A47D 9/02 |
| | | | | 297/256.16 |
| 2018/0296006 | A1 * | 10/2018 | Robbins | A47D 13/105 |
| 2019/0059610 | A1 * | 2/2019 | Chen | A47D 9/02 |
| 2019/0075935 | A1 * | 3/2019 | Ng | H02K 41/031 |
| 2019/0131859 | A1 * | 5/2019 | Caccia | H01F 7/1615 |
| 2019/0328152 | A1 * | 10/2019 | Chen | A47D 9/02 |

\* cited by examiner

SPRING SWINGING ELECTROMAGNETIC CRADLE

BACKGROUND OF THE INVENTION

1. Field of the Invention

The present invention relates to a baby nursing appliance and, more particularly, to a cradle for placing and pacifying a baby.

2. Description of the Related Art

A cradle or rocking bed is used to place a baby so that the baby can lie and sleep in the cradle to facilitate the caregiver nursing the baby. A conventional cradle has an electric rocking function to pacify the baby so that the baby feels comfortable and sleeps well. The conventional cradle is hanging freely and oscillating like a pendulum. However, the swinging action of the conventional cradle contains a track with upward and downward displacement. Thus, the pendulum type swinging action easily causes danger to the baby's brain.

BRIEF SUMMARY OF THE INVENTION

The primary objective of the present invention is to provide a non-hanging type spring swinging (or rocking or swaying or shaking) electromagnetic (or electric) cradle that swings horizontally.

In accordance with the present invention, there is provided an electromagnetic cradle comprising a support frame, a swinging table, four abutting members, two sliding members, two guiding members, two pairs of springs, a magnetic box, and an electromagnetic device. The support frame includes two stands and two parallel support rods mounted between the two stands. Each of the two support rods has two ends secured to the two stands respectively. Each of the two support rods is provided with two snap rings and two rollers corresponding to the two snap rings. The swinging table includes a table board. Each of the four abutting members has an abutment. The abutment has a bottom provided with a track slot. The abutments of the four abutting members are secured to a bottom of the table board. The track slots of the four abutting members rest on the four rollers respectively. Each of the two sliding members has a slide. The slide has a U-shaped cross-sectional configuration and defines a channel. The slide forms a connecting column and at least one limit column at a bottom of the channel. The slides of the two sliding members are secured to the bottom of the table board, with the channel facing the table board. Each of the two guiding members has a guide. The guide has a top provided with a spring chamber extending downward. The spring chamber has a bottom provided with a perforation. The guide has a bottom provided with at least one limit slot extending upward. The guide has two arms formed on two ends thereof. Each of the two arms is provided with a rod recess and a roller recess. The rod recess is connected to the roller recess. The guide of each of the two guiding members is received in the channel of each of the two sliding members. The connecting column of each of the two sliding members extends through the perforation into the spring chamber of each of the two guiding members. The at least one limit column of each of the two sliding members extends into the at least one limit slot of each of the two guiding members. The rod recess of each of the two guiding members is mounted on each of the two support rods. The roller recess of each of the two guiding members is mounted on each of the two rollers. Each of the two guiding members straddles each of the two support rods. The two pairs of springs are mounted in the spring chambers of the two guiding members respectively. Each of the springs has a first end secured to the connecting column of one of the two sliding members and a second end secured to one end of the spring chamber of one of the two guiding members. The magnetic box includes a box body and at least one magnet mounted in the box body. The box body of the magnetic box is secured to the bottom of the table board. Each of the at least one magnet has the same magnetic pole directed toward the table board. The electromagnetic device is secured to one of the two stands. The electromagnetic device is located under and corresponds to the magnetic box.

In practice, the four abutting members are secured to the bottom of the swinging table, the track slots of the four abutting members rest on the four rollers respectively, such that the swinging table horizontally swings leftward and rightward along the four rollers. When the swinging table swings, the two sliding members are driven by the swinging table and slide reciprocatingly along the two guiding members, such that the springs are extended and compressed by the two sliding members. When the swinging table is moved horizontally, the at least one limit column of each of the two sliding members is limited by the at least one limit slot of each of the two guiding members, such that the length of the at least one limit slot of each of the two guiding members is the maximum movement distance of the swinging table.

The power source of the swinging motion comes from the electromagnetic device. The electromagnetic device produces a magnetic force to attract or repel the magnetic box that is mounted on the swinging table, so as to pull or push the swinging table, such that the swinging table swings successively and reciprocatingly.

According to the primary advantage of the present invention, the four abutting members rest on the four rollers respectively, such that the swinging table swings horizontally, without moving upward and downward, while the springs provide a buffering effect, so as to protect the baby's safety, thereby preventing from causing danger or hurting the baby's brain.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
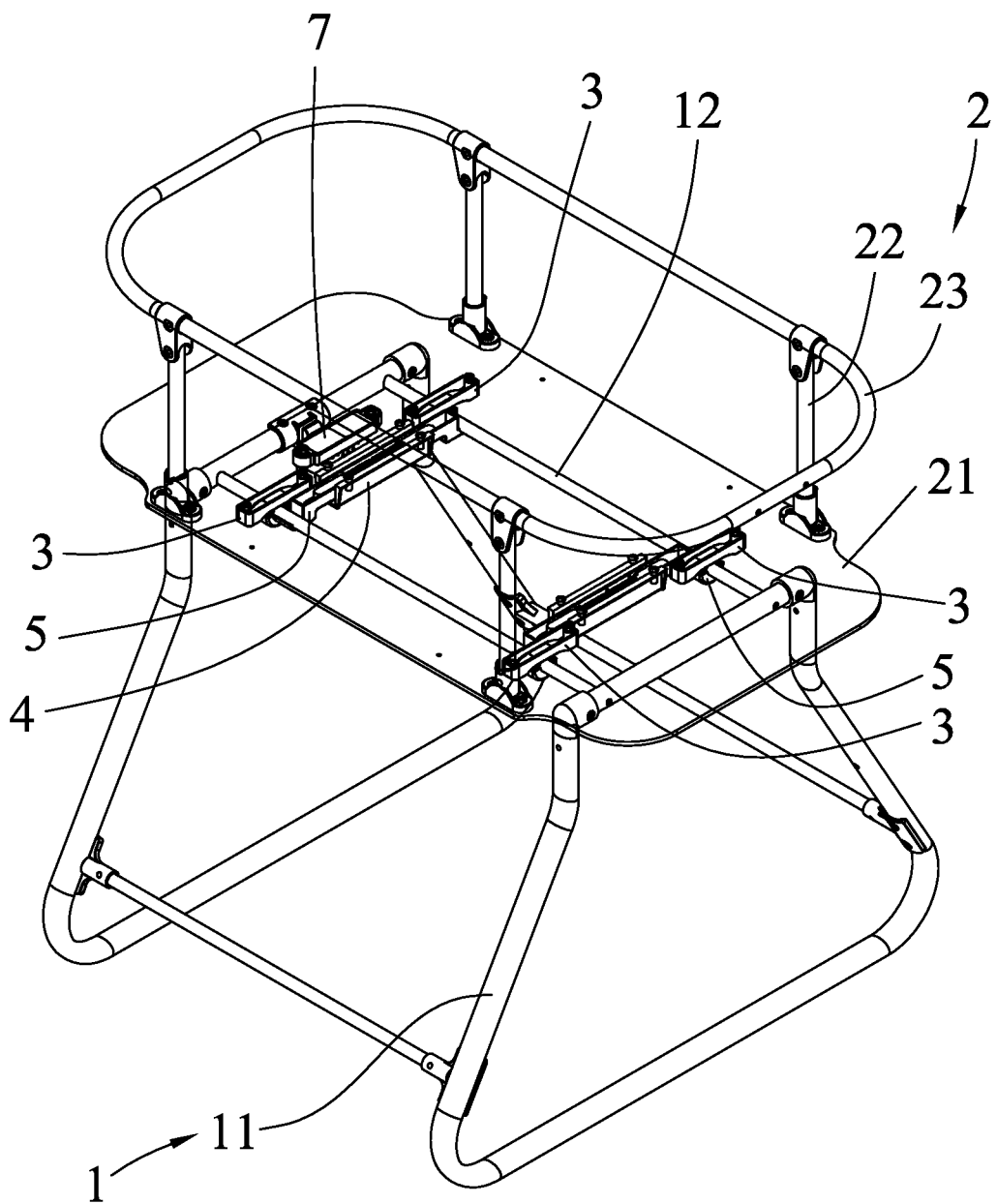
FIG. 1 is a perspective view of an electromagnetic cradle in accordance with the preferred embodiment of the present invention.
Figure 2:
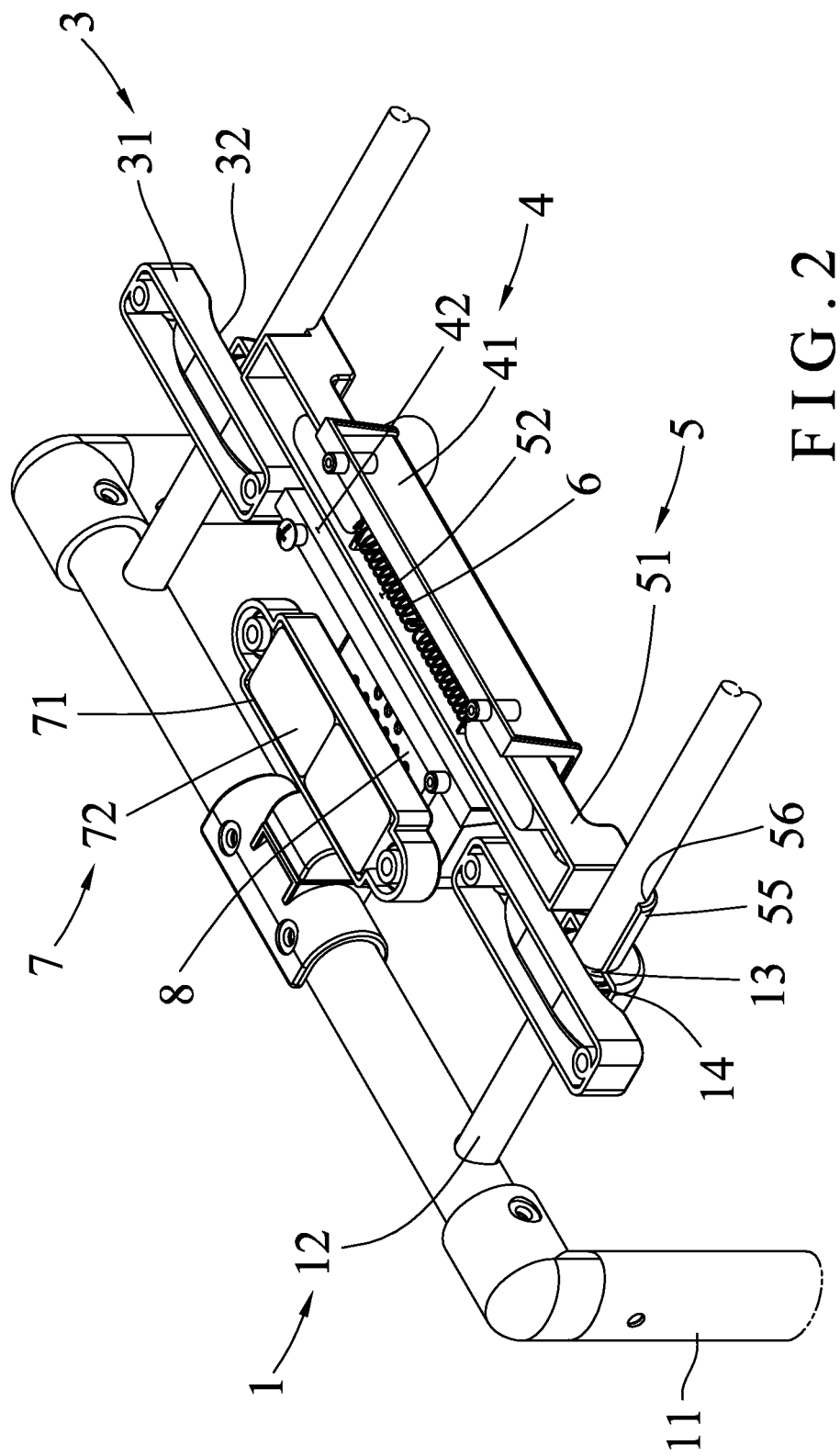
FIG. 2 is a locally enlarged view of the electromagnetic cradle as shown in FIG. 1.
Figure 3:
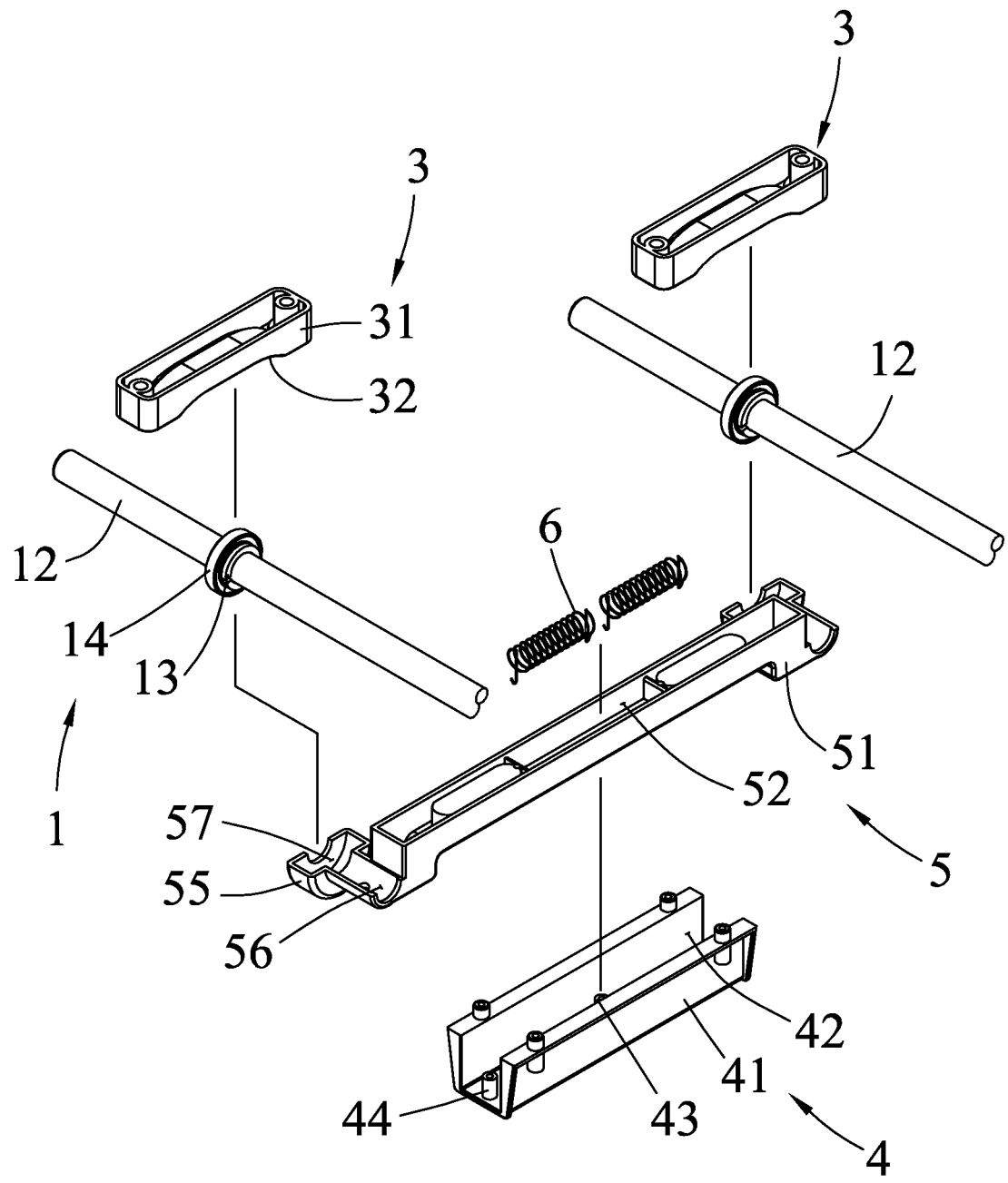
FIG. 3 is a partial exploded perspective view of the electromagnetic cradle in accordance with the preferred embodiment of the present invention.
Figure 4:
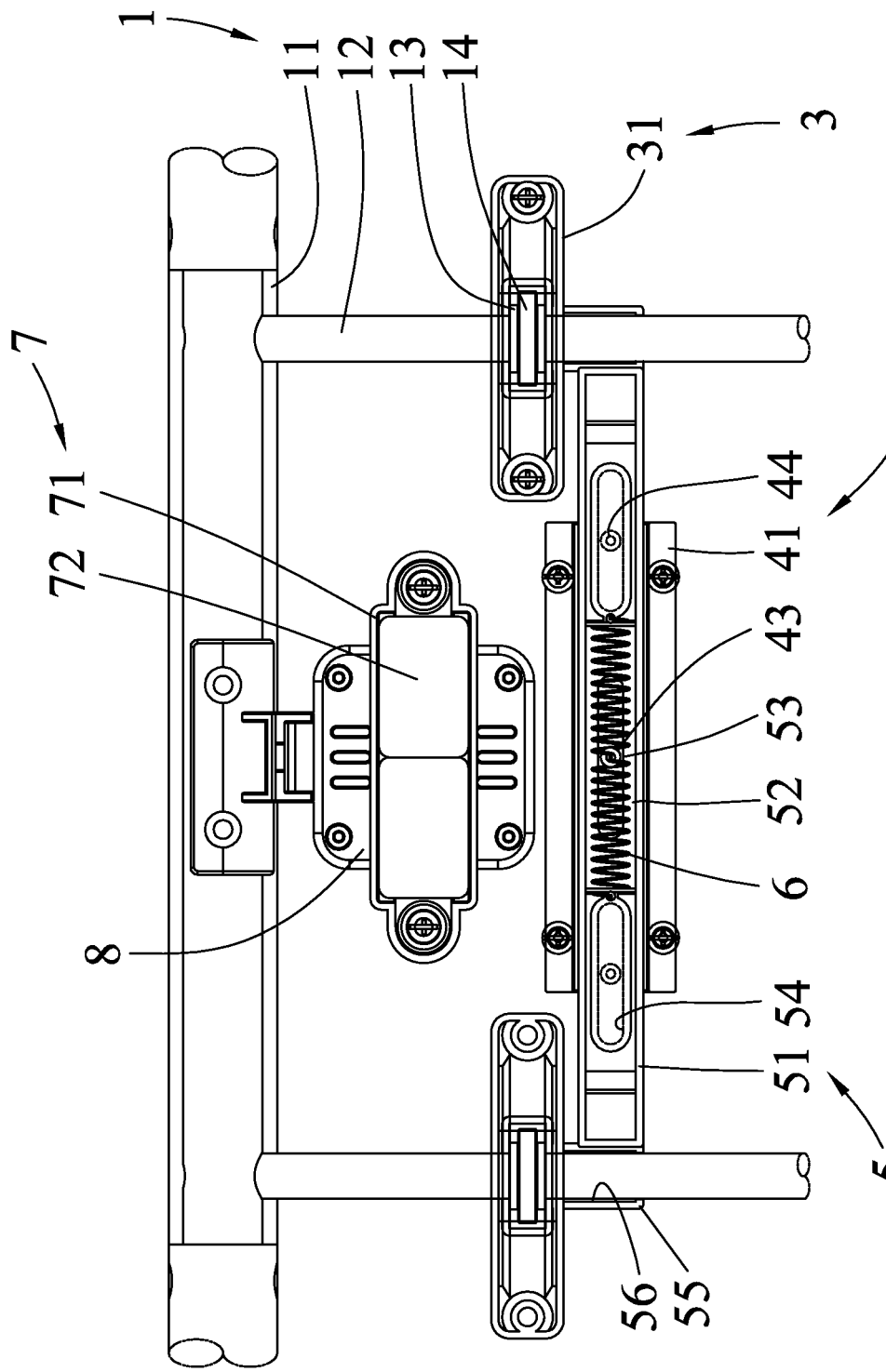
FIG. 4 is a top view of the electromagnetic cradle as shown in FIG. 2.
Figure 5:
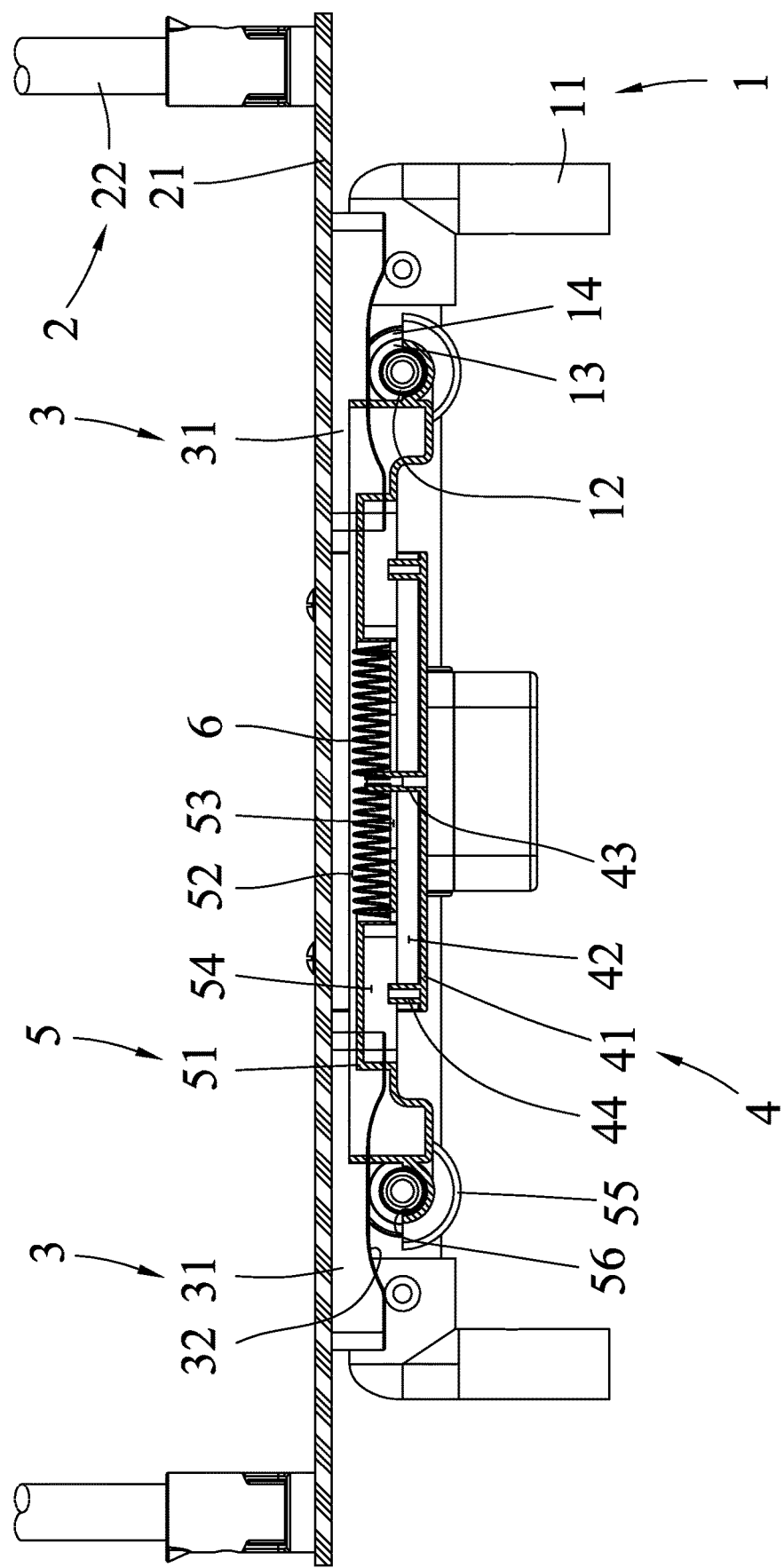
FIG. 5 is a cross-sectional view of the electromagnetic cradle in accordance with the preferred embodiment of the present invention.

Referring to the drawings and initially to FIGS. 1-5, an electromagnetic cradle in accordance with the preferred embodiment of the present invention comprises a support frame 1, a swinging (or moving or shaking or rocking) table 2, four abutting members 3, two sliding members 4, two guiding members 5, two pairs of springs 6, a magnetic box 7, and an electromagnetic device 8.

The support frame 1 includes two stands 11 and two parallel support rods 12 mounted between the two stands 11. Each of the two support rods 12 has two ends secured to the two stands 11 respectively. Each of the two support rods 12 is provided with two snap rings 13 and two rollers 14 corresponding to the two snap rings 13. The two rollers 14 are rotated relative to each of the two support rods 12 and cannot be moved on each of the two support rods 12.

The swinging table 2 includes a table board 21.

Each of the four abutting members 3 has an abutment 31. The abutment 31 has a bottom provided with a track slot 32. The abutments 31 of the four abutting members 3 are secured to a bottom of the table board 21. The track slots 32 of the four abutting members 3 rest on the four rollers 14 respectively.

Each of the two sliding members 4 has a slide 41. The slide 41 has a U-shaped cross-sectional configuration and defines a channel 42. The slide 41 forms a connecting column 43 and at least one limit column 44 at a bottom of the channel 42. The slides 41 of the two sliding members 4 are secured to the bottom of the table board 21, with the channel 42 facing the table board 21.

Each of the two guiding members 5 has a guide 51. The guide 51 has a top provided with a spring chamber 52 extending downward. The spring chamber 52 has a bottom provided with a perforation 53 (see FIG. 5). The guide 51 has a bottom provided with at least one limit slot 54 (see FIG. 5) extending upward. The guide 51 has two arms 55 formed on two ends thereof. Each of the two arms 55 is provided with a rod recess 56 and a roller recess 57. The rod recess 56 is connected to the roller recess 57. The guide 51 of each of the two guiding members 5 is received in the channel 42 of each of the two sliding members 4. The connecting column 43 of each of the two sliding members 4 extends through the perforation 53 into the spring chamber 52 of each of the two guiding members 5. The at least one limit column 44 of each of the two sliding members 4 extends into the at least one limit slot 54 of each of the two guiding members 5. The rod recess 56 of each of the two guiding members 5 is mounted on each of the two support rods 12. The roller recess 57 of each of the two guiding members 5 is mounted on each of the two rollers 14. Each of the two guiding members 5 straddles each of the two support rods 12.

The two pairs of springs 6 are mounted in the spring chambers 52 of the two guiding members 5 respectively. Each of the springs 6 has a first end secured to the connecting column 43 of one of the two sliding members 4 and a second end secured to one end of the spring chamber 52 of one of the two guiding members 5.

The magnetic box 7 includes a box body 71 and at least one magnet 72 mounted in the box body 71. The box body 71 of the magnetic box 7 is secured to the bottom of the table board 21. Each of the at least one magnet 72 has the same magnetic pole directed toward the table board 21.

The electromagnetic device 8 is secured to one of the two stands 11. The electromagnetic device 8 is located under and corresponds to the magnetic box 7.

In the preferred embodiment of the present invention, the swinging table 2 further includes four upright posts 22 secured on the table board 21, and an enclosure (or a loop or an endless bar) 23 secured on the four upright posts 22.

In the preferred embodiment of the present invention, the track slot 32 of each of the four abutting members 3 has an arch-shaped cross-sectional configuration with a flat top and two arcuate sides.

In the preferred embodiment of the present invention, the slide 41 forms two limit columns 44. The connecting column 43 and the two limit columns 44 are arranged linearly along a lengthwise direction of the channel 42. The connecting column 43 is located between the two limit columns 44. The guide 51 has two limit slots 54 located at the two ends of the spring chamber 52.

In the preferred embodiment of the present invention, the magnetic box 7 includes two magnets 72 juxtaposed to each other. Each of the two magnets 72 is a permanent magnet. The same magnetic poles of the two magnets 72 are directed toward the table board 21.

In practice, the four abutting members 3 are secured to the bottom of the swinging table 2, the track slots 32 of the four abutting members 3 rest on the four rollers 14 respectively, and the track slot 32 of each of the four abutting members 3 has an arch-shaped cross-sectional configuration with a flat top, such that the swinging table 2 horizontally swings leftward and rightward. When the swinging table 2 swings, the two sliding members 4 are driven by the swinging table 2 and slide reciprocatingly along the two guiding members 5, such that the springs 6 are extended and compressed by the two sliding members 4. As shown in FIGS. 1-5, the swinging table 2 is static and located at a start position. When the swinging table 2 is moved to a first position where the at least one limit column 44 of each of the two sliding members 4 contacts and is stopped by a left end of the at least one limit slot 54 of each of the two guiding members 5, the swinging table 2 is limited and located at the left limit position. When the swinging table 2 is moved to a second position where the at least one limit column 44 of each of the two sliding members 4 contacts and is stopped by a right end of the at least one limit slot 54 of each of the two guiding members 5, the swinging table 2 is limited and located at the right limit position. The power source of the swinging motion comes from the electromagnetic device 8. The electromagnetic device 8 produces magnetism in a regularly intermittent manner. For example, the electromagnetic device 8 produces a magnetic field successively during one second and keeps stationary during one second. The above procedure is repeated such that the electromagnetic device 8 produces magnetism in a regularly intermittent manner. Alternatively, the electromagnetic device 8 produces magnetism by a repeated inversion of the N-pole and the S-pole. In addition, when the electromagnetic device 8 produces magnetism, the electromagnetic device 8 magnetically attracts or repel the at least one magnet 72 according to the direction of the magnetic poles, so as to drive the swinging table 2.

Figure 6:
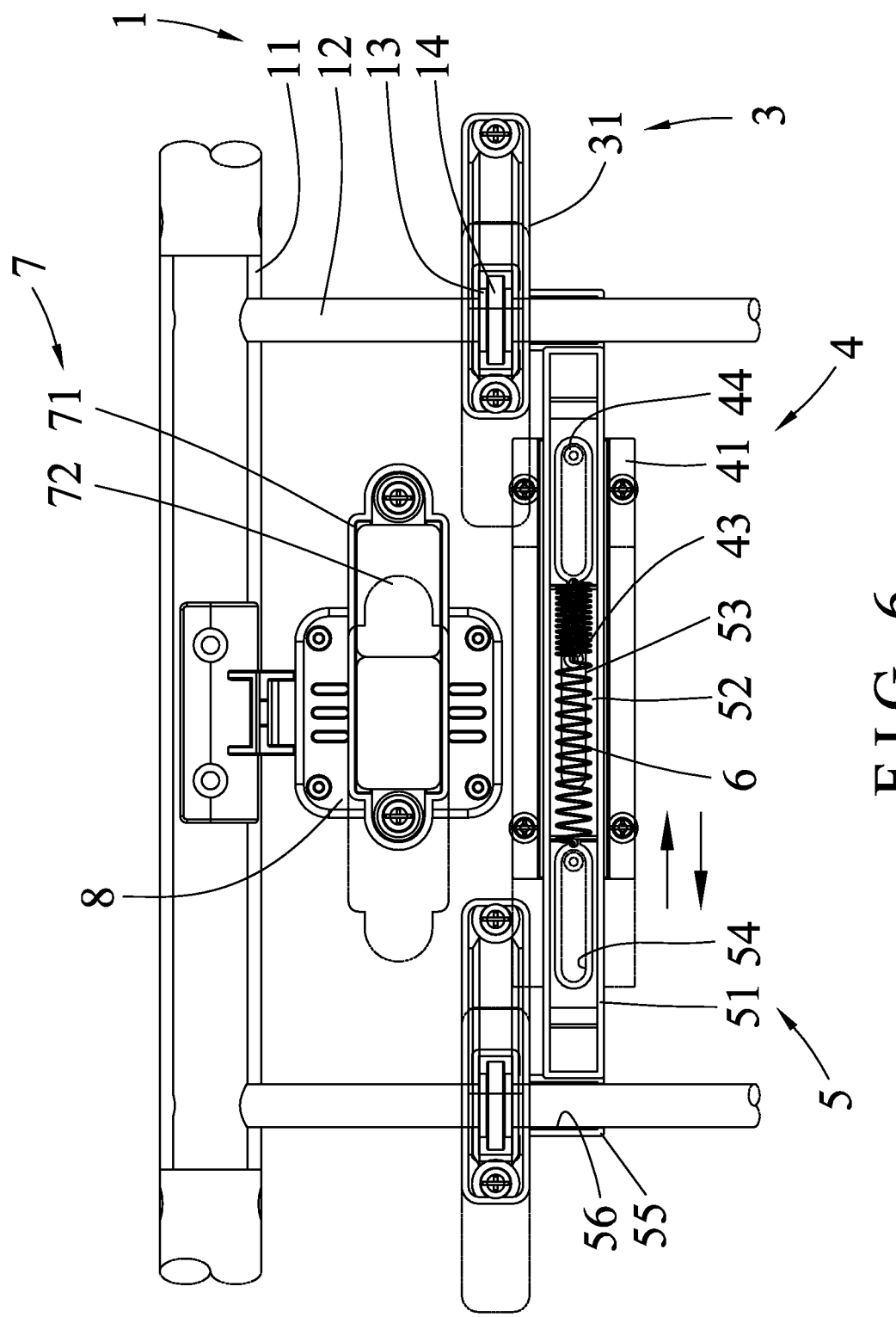
FIG. 6 is an operational view of the electromagnetic cradle as shown in FIG. 4.
Figure 7:
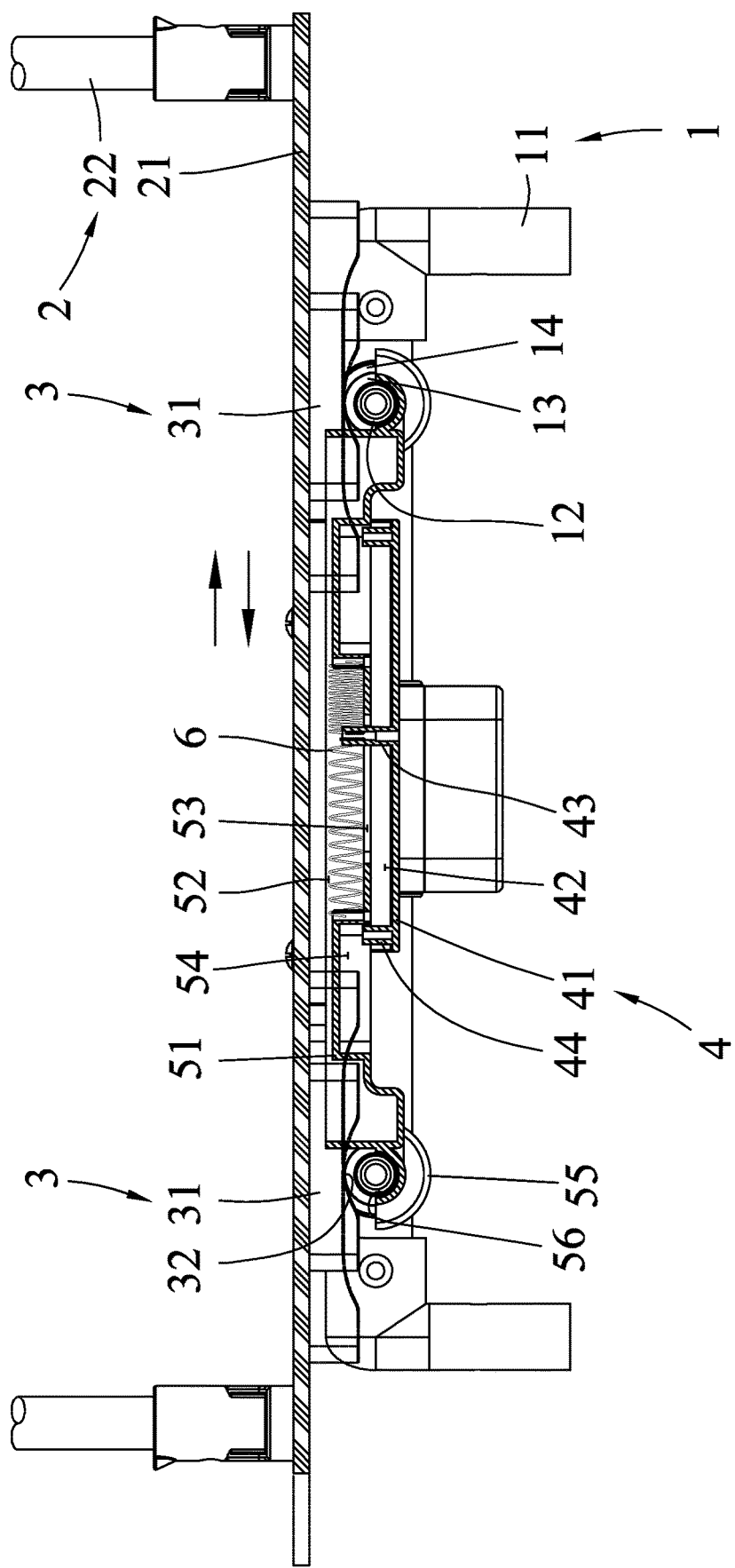
FIG. 7 is an operational view of the electromagnetic cradle as shown in FIG. 5.

In operation, referring to FIGS. 6 and 7 with reference to FIGS. 1-5, it is assumed that the electromagnetic device 8 produces magnetism in a regularly intermittent manner. When the swinging table 2 is moved from the start position to the left (or right) limit position, the electromagnetic device 8 repels the at least one magnet 72, and when the swinging table 2 is moved from the left (or right) limit position to the start position, the magnetism of the electromagnetic device 8 disappears such that the electromagnetic device 8 does not produce magnetism. In such a manner, the user initially pushes the swinging table 2 from the start position to the left (or right) limit position. Then, the electromagnetic device 8 is started, and the swinging table 2 is released, such that the swinging table 2 is driven by the restoring force of the springs 6 and moved toward the start position. At this time, the electromagnetic device 8 does not produce magnetism. After the swinging table 2 is moved to the start position, the swinging table 2 is moved toward the right (or left) limit position due to the inertia action. At this time, the electromagnetic device 8 repels the at least one magnet 72, such that the swinging table 2 is moved to the right (or left) limit position. After the swinging table 2 is moved to the right (or left) limit position, the swinging table 2 is driven by the restoring force of the springs 6 and moved toward the start position. At this time, the electromagnetic device 8 does not produce magnetism. Thus, the electromagnetic device 8 produces a repulsion force to push the swinging table 2 when the swinging table 2 is moved from the start position to the left (or right) limit position, such that the swinging table 2 is moved reciprocatingly and is swung leftward and rightward.

Alternatively, it is assumed that the electromagnetic device 8 produces magnetism by a repeated inversion of the N-pole and the S-pole. When the swinging table 2 is moved from the start position to the left (or right) limit position, the electromagnetic device 8 repels the at least one magnet 72 by repeated inversion of the electromagnetic device 8, and when the swinging table 2 is moved from the left (or right) limit position to the start position, the electromagnetic device 8 attracts the at least one magnet 72 by repeated inversion of the electromagnetic device 8. Thus, after the swinging table 2 is pushed and moved from the start position to the left (or right) limit position, the swinging table 2 is released, such that the swinging table 2 is moved reciprocatingly and is swung leftward and rightward.

In another preferred embodiment of the present invention, the electromagnetic device 8 includes a magnetic sensor which detects the relative position and movement direction of the at least one magnet 72, such that when the at least one magnet 72 is close to the electromagnetic device 8, the electromagnetic device 8 produces a magnetically attractive force, and when the at least one magnet 72 is away from the electromagnetic device 8, the electromagnetic device 8 produces a magnetically repulsive force.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. An electromagnetic cradle comprising:
a support frame, a swinging table, four abutting members, two sliding members, two guiding members, two pairs of springs, a magnetic box, and an electromagnetic device;
wherein:
the support frame includes two stands and two parallel support rods mounted between the two stands;
each of the two support rods has two ends secured to the two stands respectively;
each of the two support rods is provided with two snap rings and two rollers corresponding to the two snap rings;
the swinging table includes a table board;
each of the four abutting members has an abutment;
the abutment has a bottom provided with a track slot;
the abutments of the four abutting members are secured to a bottom of the table board;
the track slots of the four abutting members rest on the four rollers respectively;
each of the two sliding members has a slide;
the slide has a U-shaped cross-sectional configuration and defines a channel;
the slide forms a connecting column and at least one limit column at a bottom of the channel;
the slides of the two sliding members are secured to the bottom of the table board, with the channel facing the table board;
each of the two guiding members has a guide;
the guide has a top provided with a spring chamber extending downward;
the spring chamber has a bottom provided with a perforation;
the guide has a bottom provided with at least one limit slot extending upward;
the guide has two arms formed on two ends thereof;
each of the two arms is provided with a rod recess and a roller recess;
the rod recess is connected to the roller recess;
the guide of each of the two guiding members is received in the channel of each of the two sliding members;
the connecting column of each of the two sliding members extends through the perforation into the spring chamber of each of the two guiding members;
the at least one limit column of each of the two sliding members extends into the at least one limit slot of each of the two guiding members;
the rod recess of each of the two guiding members is mounted on each of the two support rods;
the roller recess of each of the two guiding members is mounted on each of the two rollers;
each of the two guiding members straddles each of the two support rods;
the two pairs of springs are mounted in the spring chambers of the two guiding members respectively;
each of the springs has a first end secured to the connecting column of one of the two sliding members and a second end secured to one end of the spring chamber of one of the two guiding members;
the magnetic box includes a box body and at least one magnet mounted in the box body;
the box body of the magnetic box is secured to the bottom of the table board;
each of the at least one magnet has the same magnetic pole directed toward the table board;
the electromagnetic device is secured to one of the two stands; and
the electromagnetic device is located under and corresponds to the magnetic box.

2. The electromagnetic cradle as claimed in claim 1, wherein the swinging table further includes four upright posts secured on the table board, and an enclosure secured on the four upright posts.

3. The electromagnetic cradle as claimed in claim 1, wherein the track slot of each of the four abutting members has an arch-shaped cross-sectional configuration with a flat top.

* * * * *